US 6,588,513 B1

(12) United States Patent
Gustafson

(10) Patent No.: US 6,588,513 B1
(45) Date of Patent: Jul. 8, 2003

(54) ARTICULATING HITCH ASSEMBLY

(75) Inventor: Alan D. Gustafson, Leland, IL (US)

(73) Assignee: AGCO Corporation, Duluth, GA (US)

( * ) Notice: Subject to any disclaimer, the term of this patent is extended or adjusted under 35 U.S.C. 154(b) by 49 days.

(21) Appl. No.: 09/589,213

(22) Filed: Jun. 7, 2000

(51) Int. Cl.[7] .......................... A01B 63/02; A01B 59/06
(52) U.S. Cl. ...................... 172/439; 172/677
(58) Field of Search ............... 172/272, 439, 172/445, 445.1, 445.2, 446, 447, 450, 677, 679; 180/900; 280/467, 488, 499

(56) References Cited

U.S. PATENT DOCUMENTS

| 1,501,652 A | | 7/1924 | Ferguson | |
|---|---|---|---|---|
| 1,864,639 A | | 6/1932 | Crezee | |
| 2,506,773 A | * | 5/1950 | Bunting | 280/448 |
| 2,971,775 A | | 2/1961 | Fraga | |
| 3,031,208 A | * | 4/1962 | Abbott | 172/439 |
| 3,255,828 A | * | 6/1966 | Abbott | 172/439 |
| 3,583,494 A | * | 6/1971 | Thompson | 172/439 |
| 3,677,565 A | * | 7/1972 | Slosiarek | 280/499 |
| 3,727,698 A | * | 4/1973 | Van Selus | 172/439 |
| 4,216,975 A | * | 8/1980 | Schafer | 172/439 |
| 4,645,226 A | * | 2/1987 | Gustavsson et al. | 172/450 |
| 4,944,649 A | | 7/1990 | Stralow | |
| 5,697,454 A | | 12/1997 | Wilcox et al. | |
| 5,823,270 A | | 10/1998 | Cooper | |
| 5,971,082 A | | 10/1999 | Satzler | |
| 5,997,024 A | | 12/1999 | Cowley | |
| 6,003,614 A | | 12/1999 | Crabb | |
| 6,223,841 B1 | * | 5/2001 | Susag et al. | 180/53.4 |
| 6,257,347 B1 | * | 7/2001 | Campisi | 172/439 |

OTHER PUBLICATIONS

Tractores Agricolas, Maquinas USA, http://www-.maquinasusa.com/generic.html?pid+22 (tractor model—1996).*

* cited by examiner

Primary Examiner—Robert E. Pezzuto
Assistant Examiner—Nathan Mammen
(74) Attorney, Agent, or Firm—Wm. Brook Lafferty, Esq.; Gerald R. Boss, Esq.; Troutman Sanders LLP

(57) ABSTRACT

A hitch assembly for a work machine, particularly suitable for use in a track-type tractor, is provided with a frame having a generally vertical pivot axis. A pair of draft arms are carried by the frame, with each draft arm being pivotable about a corresponding generally horizontal axis. A drawbar is carried by the frame and is pivotable about the pivot axis of the frame. The drawbar may be fixed or movable relative to the frame, and also pivots about the common pivot axis.

25 Claims, 3 Drawing Sheets

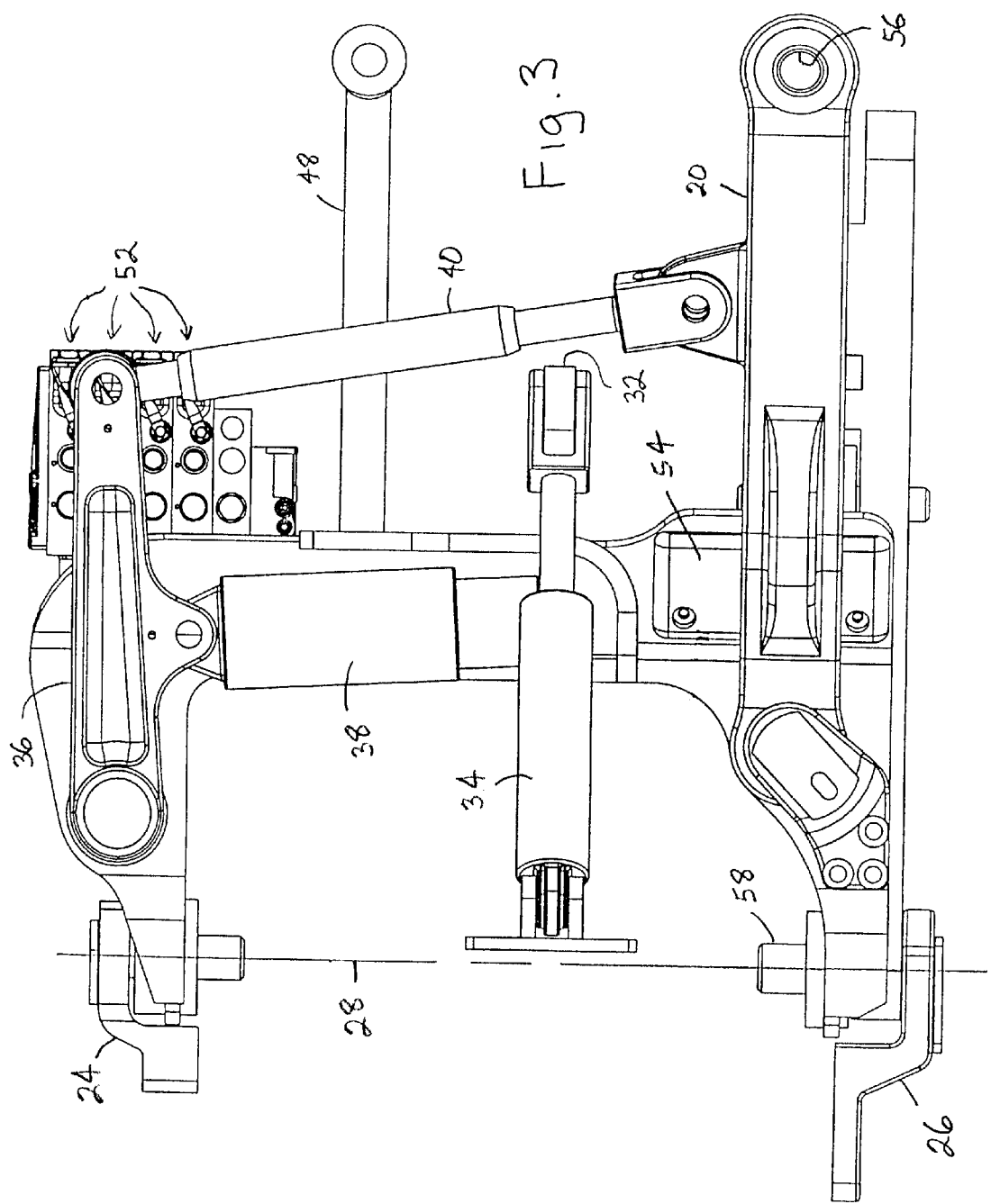

ARTICULATING HITCH ASSEMBLY

TECHNICAL FIELD

The present invention relates to a hitch assembly on a work machine which is couplable with an implement, and, more particularly to an articulating hitch assembly on a work machine.

BACKGROUND ART

Agricultural tractors and other work machines are commonly used to tow implements behind them for various purposes, including planting, plowing and leveling. It is important to control the implement so that turning and other desired operations can be readily accomplished. Hitches are commonly incorporated on the back of a tractor to provide a point of attachment for the implement to the tractor. Such hitches have been designed to provide some movement of the implement relative to the tractor through hydraulic or other control mechanisms controlled by the tractor operator. For example, U.S. Pat. No. 5,971,082 (Satzler), assigned to the assignee of the present invention, discloses a track-type tractor with a three point hitch having a frame which may be angularly adjusted relative to the rear end of the tractor. A drawbar is rigidly affixed to the frame, and moves with the hitch assembly relative to the rear end of the tractor. Other articulating hitch assemblies are disclosed in U.S. Pat. No. 5,823,270 (Cooper), assigned to the assignee of the present invention; and U.S. Pat. No. 5,697,454 (Wilcox et al.). Although a step forward in the art, increased and controlled angular adjustment of both the hitch assembly and drawbar are desirable.

The present invention is directed to overcoming one or more of the problems as set forth above.

DISCLOSURE OF THE INVENTION

In one aspect of the invention, a hitch assembly for a work machine is provided with a frame having a generally vertical pivot axis. A pair of draft arms are carried by the frame, with each draft arm being pivotable about a corresponding generally horizontal axis. A drawbar is carried by the frame and is pivotable about the pivot axis of the frame.

In another aspect of the invention, a method of utilizing a hitch assembly in a work machine is provided with the steps of: pivoting a frame about a generally vertical pivot axis; coupling a pair of draft arms with the frame; pivoting each draft arm about a corresponding generally horizontal axis; carrying a drawbar with the frame; and pivoting the drawbar about the pivot axis of the frame.

BRIEF DESCRIPTION OF THE DRAWINGS

FIG. 3 is a side view of the hitch assembly shown in FIGS. 1 and 2.

BEST MODE FOR CARRYING OUT THE INVENTION

Figure 1:
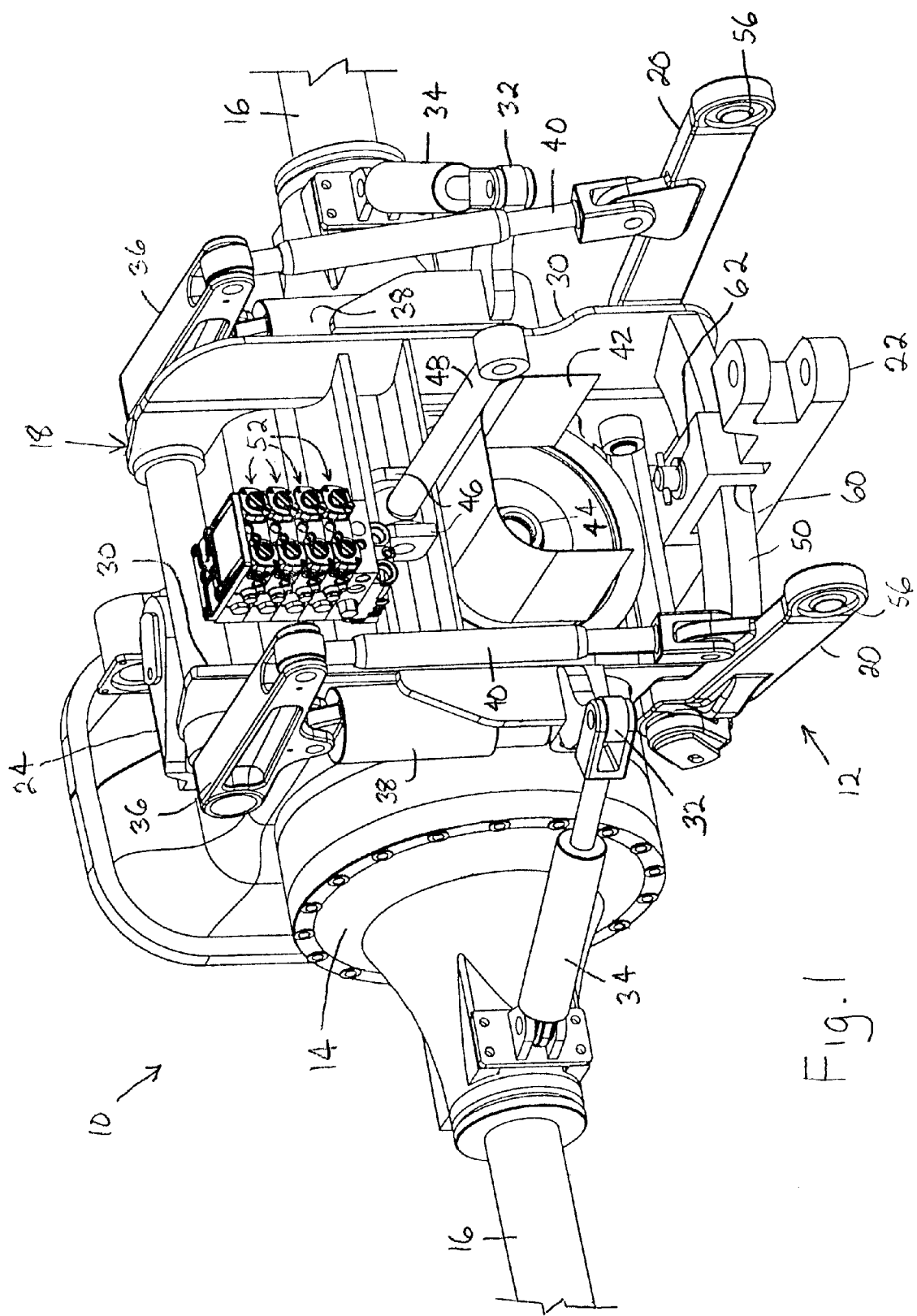
FIG. 1 is a perspective view of a portion of a work machine, including an embodiment of a hitch assembly of the present invention.

Referring now to the drawings, there is shown an embodiment of a work machine 10, including an embodiment of a hitch assembly 12 of the present invention.

Work machine 10 may be any type of work machine which utilizes hitch assembly 12. In the embodiment shown, only a portion of work machine 10 is shown. More particularly, rear end housing 14 including a rear end differential (not shown) therein, rotatably drives a pair of rear axles 16. Each rear axle 16 in turn provides forward motive force to work machine 10, such as through an associated track or wheel. In the embodiment shown, work machine 10 is in the form of a track-type tractor with a pair of tracks which are respectively driven by rear axles 16.

Hitch assembly 12 generally includes a frame 18, pair of draft arms 20 and drawbar 22. Frame 18 includes upper mounting block 24 and lower mounting block 26 which are rigidly affixed to rear end housing 14. Upper mounting block 24 and lower mounting block 26 are in turn pivotally connected to frame 18 about a common, generally vertical pivot axis 28. Frame 18 also includes opposite sides 30, with each side 30 having a coupler 32 associated therewith. Each coupler 32 provides attachment with a hydraulic cylinder 34, which in turn is pivotally connected with rear end housing 14. Hydraulic cylinders 34 are controllably actuated using a controller (not shown) to pivot frame 18 about pivot axis 28. In the embodiment shown, frame 18 can pivot approximately ±15° about pivot axis 28 (i.e., through a total angle of approximately 30°). However, it will be appreciated that frame 18 may be configured to pivot a greater or lesser extent, depending upon the particular configuration and application.

Frame 18 also includes a pair of lift arms 36 which are pivotable about a horizontal axis. Each lift arm 36 is coupled with a hydraulic cylinder 38, with each hydraulic cylinder 38 being actuatable to provide lifting force to the associated lift arm 36. A distal end of each lift arm 36 is pivotally coupled with an adjustable length arm 40, which in turn is pivotally connected at an opposing end thereof with a corresponding draft arm 20.

Frame 18 includes a cutout portion (not numbered) which generally surrounds power take-off shield 42 which is rigidly attached to and extends from rear end housing 14. Power take-off shield 42 shields a power take-off shaft (not shown) which is rotatably carried within opening 44.

Frame 18 also includes a pair of brackets 46 which are positioned in spaced apart relationship relative to each other, and allow attachment with a top link 48. Top link 48 includes an opposing end which may be pivotally coupled with a 3-point mountable implement (not shown) in conventional manner.

Frame 18 further includes an arcuate pivot bar 50 which extends between and is rigidly attached with opposing sides 30. Pivot bar 50 provides supported, pivotal movement of drawbar 22, as will be described hereinafter.

A bank of hydraulic outlets 52 are also attached with and carried by frame 18. In the embodiment shown, four pairs of hydraulic outlets 52 are provided, with each horizontally adjacent pair of hydraulic outlets 52 couplable with a hydraulic cylinder on an implement (not shown) attached with hitch assembly 12.

Draft arms 20 are pivotally coupled with frame 18 using a spherical ball joint (not numbered). Each draft arm 20 may be raised in a vertical direction using lift arms 36, and may be moved in a generally horizontal direction away from frame 18. A pair of spacers 54 which are removably attached to frame 18 allow the distance between draft arms 20 to be varied, depending upon the particular hitch classification for which hitch assembly 20 is utilized. That is, draft arms 20 may be moved closer together when spacers 54 are removed.

Each draft arm 20 includes a ball joint 56 at a distal end thereof, which allows connection with the implement.

Figure 2:
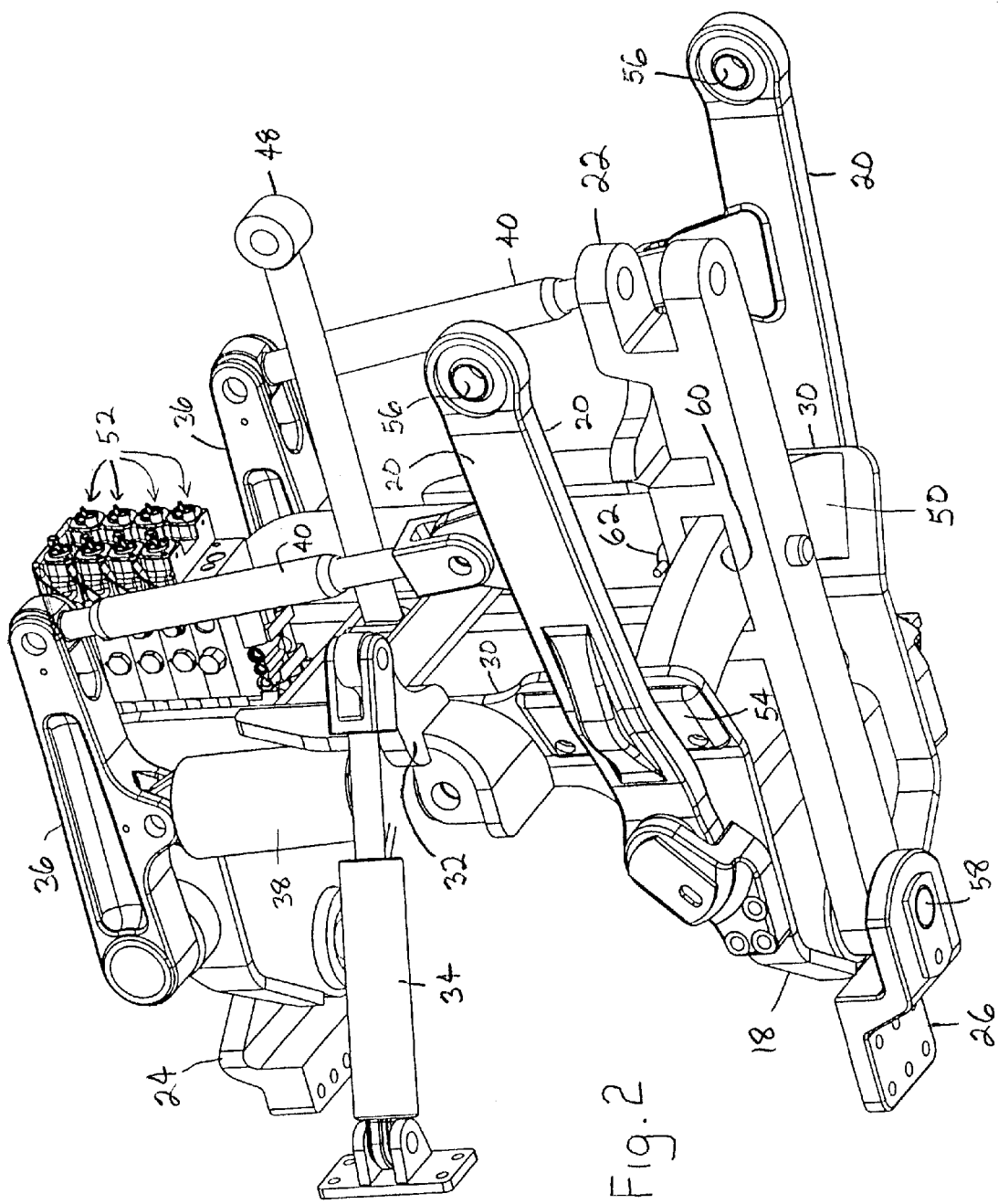
FIG. 2 is another perspective view of the hitch assembly shown in FIG. 1.

Drawbar 22 is coupled with frame 18 and pivots about common pivot axis 28. Referring to FIG. 2, pin 58 extends between lower mounting block 26 and frame 18. Drawbar 22 includes an opening (not shown) through which pin 58 extends, thereby allowing pivotal movement of drawbar 22 about pivot axis 28.

Drawbar 22 includes a generally rectangular opening 60 through which arcuate pivot bar 50 extends. A pin 62 extends through openings (not numbered) extending through each of drawbar 22 and pivot bar 50 to lock drawbar 22 relative to pivot bar 50.

Industrial Applicability

During use, an implement (not shown) is coupled with draft arms 20 and top link 48 in known manner. Hydraulic cylinders 34 are controllably actuated to pivot frame 18 about pivot axis 28. In the embodiment shown, the range of rotation of frame 18 about pivot axis 28 is approximately ±15° (for a total rotational angle of approximately 30°). Drawbar 22 may be fixed with pivot bar 20 using pin 62. When coupled together, pivotal movement of frame 18 in turn causes pivotal movement of drawbar 22. Thus, drawbar 22 is pivotal through a range of motion of approximately ±15° when coupled with pivot bar 50. Alternatively, pin 62 may be removed so that drawbar 22 is free to pivot about pivot axis 28 and slide along pivot bar 50. In the embodiment shown, the range of motion of drawbar 22 relative to frame 18 is approximately ±25°. Thus, if drawbar 22 is free to slide along pivot bar 50 and frame 18 is pivoted to a maximum pivot point, the maximum angular rotation of drawbar 22 is approximately ±40° (i.e., ±15° frame movement plus ±25° relative movement between drawbar 22 and frame 18). The opening within frame 18 which surrounds power take-off shield 42 is sufficient to allow proper operation of a power take-off shaft extending from opening 44. Moreover, the bank of hydraulic outlets 52 also maintains a constant angular orientation with respect to frame 18 during pivotal movement of frame 18 as a result of the rigid attachment therebetween. Proper angular orientation of hydraulic hoses extending from the bank of hydraulic outlets 52 thus is maintained. Moreover, the horizontal distance between draft arms 20 may be varied by attaching or detaching spacers 54 from frame 18. Hitch assembly 12 may be thus easily modified from one hitch class to another (e.g., class 4 to class 4N).

Hitch assembly 12 of the present invention carries drawbar 22 in either a fixed or freely pivotal manner. Frame 18 and drawbar 22 each pivot about a common pivot axis, thereby simplifying construction. The bank of hydraulic outlets is attached with and carried by the frame so that the hydraulic outlets maintain a constant orientation with respect to the frame. Hitch assembly 12 of the present invention therefor provides distinct advantages not heretofore possible.

Other aspects, objects and advantages of this invention can be obtained from a study of the drawings, the disclosure and the appended claims.

What is claimed is:

1. A hitch assembly for a work machine, comprising:
    a pivoting frame having a generally vertical pivot axis;
    a pair of draft arms carried by said frame, each said draft arm pivotable about a corresponding generally horizontal axis; and
    a drawbar carried by said frame and moveable at least partially along the length of a pivot bar of said frame when said drawbar is pivoted about said vertical pivot axis of said frame.

2. The hitch assembly of claim 1, said frame being pivotable through an angle of approximately ±15° about said pivot axis.

3. The hitch assembly of claim 2, said drawbar being pivotable through an angle of approximately ±25° about said pivot axis relative to said frame.

4. The hitch assembly of claim 1, said drawbar being pivotable through an angle of approximately ±25° about said pivot axis relative to said frame.

5. The hitch assembly of claim 1, said drawbar being attachable with said pivot bar using a pinned connection.

6. The hitch assembly of claim 1, said frame including opposite sides and a pair of couplers, each said coupler positioned on a corresponding said side, and including a pair of hydraulic steering cylinders, each said steering cylinder attached with a corresponding said coupler.

7. The hitch assembly of claim 1, including at least one hydraulic outlet carried by said frame.

8. The hitch assembly of claim 7, said at least one hydraulic outlet being a bank of hydraulic outlets.

9. A work machine, comprising:
    a rear end housing; and
    a hitch assembly, including:
        a pivoting frame coupled with said rear end housing and pivotable relative to said rear end housing about a generally vertical pivot axis;
        a pair of draft arms carried by said frame, each said draft arm pivotable about a corresponding generally horizontal axis; and
        a drawbar carried by said frame and moveable at least partially along the length of a pivot bar of said frame when said drawbar is pivoted about said vertical axis of said frame.

10. The work machine of claim 9, said frame being pivotable through an angle of approximately ±15° about said pivot axis.

11. The work machine of claim 10, said drawbar being pivotable through an angle of approximately ±25° about said pivot axis relative to said frame.

12. The work machine of claim 9, said drawbar being pivotable through an angle of approximately ±25° about said pivot axis relative to said frame.

13. The work machine of claim 9, said drawbar being attachable with said pivot bar using a pinned connection.

14. The work machine of claim 9, said frame including opposite sides and a pair of couplers, each said coupler positioned on a corresponding said side, and including a pair of hydraulic steering cylinders, each said steering cylinder attached with a corresponding said coupler.

15. The work machine of claim 9, including at least one hydraulic outlet carried by said frame.

16. The work machine of claim 15, said at least one hydraulic outlet being a bank of hydraulic outlets.

17. A method of utilizing a hitch assembly in a work machine, comprising the steps of:
    pivoting a frame about a generally vertical pivot axis;
    coupling a pair of draft arms with said frame;
    pivoting each said draft arm about a corresponding generally horizontal axis;
    carrying a drawbar with said frame;
    pivoting said drawbar about said vertical pivot axis of said frame, and
    moving said drawbar at least partially along the length of a pivot bar of said frame when said drawbar is pivoted about said vertical axis of said frame.

18. The method of claim 17, said first pivoting step including pivoting said frame through an angle of approximately ±15° about said pivot axis.

19. The method of claim 18, said third pivoting step including pivoting said drawbar through an angle of approximately ±25° about said pivot axis relative to said frame.

20. The method of claim 17, said third pivoting step including pivoting said drawbar through an angle of approximately ±25° about said pivot axis relative to said frame.

21. The method of claim 17, including the step of mounting at least one hydraulic outlet to said frame.

22. A hitch assembly for a work machine, comprising:

a pivoting frame having a generally vertical pivot axis;

a pair of draft arms carried by said frame, each said draft arm pivotable about a corresponding generally horizontal axis; and a drawbar carried by said frame and pivotable about said vertical axis of said frame, said drawbar having a combined maximum angular rotation of approximately ±40° as a result of said frame being pivotable through an angle of approximately ±15° about said pivot axis and said drawbar being pivotable through an angle of approximately ±25° about said pivot axis relative to said frame.

23. The hitch assembly of claim 22 wherein said drawbar carried by said frame is moveable at least partially along the length of a pivot bar of said frame when said drawbar is pivoted about said vertical pivot axis of said frame.

24. A hitch assembly for a work machine, comprising:

a pivoting frame having a generally vertical pivot axis;

a pair of draft arms carried by said frame, each said draft arm pivotable about a corresponding generally horizontal axis; and a drawbar carried by said frame and pivotable about said vertical pivot axis of said frame, said frame and said drawbar each permitted to have an angular rotation relative to said vertical pivot axis which is different from said angular rotation of the other while said frame and said drawbar are being used simultaneously.

25. The hitch assembly of claim 24 wherein said drawbar and said frame have a combined maximum angular rotation of approximately ±40°.

* * * * *